Figures 1, 2, 3:
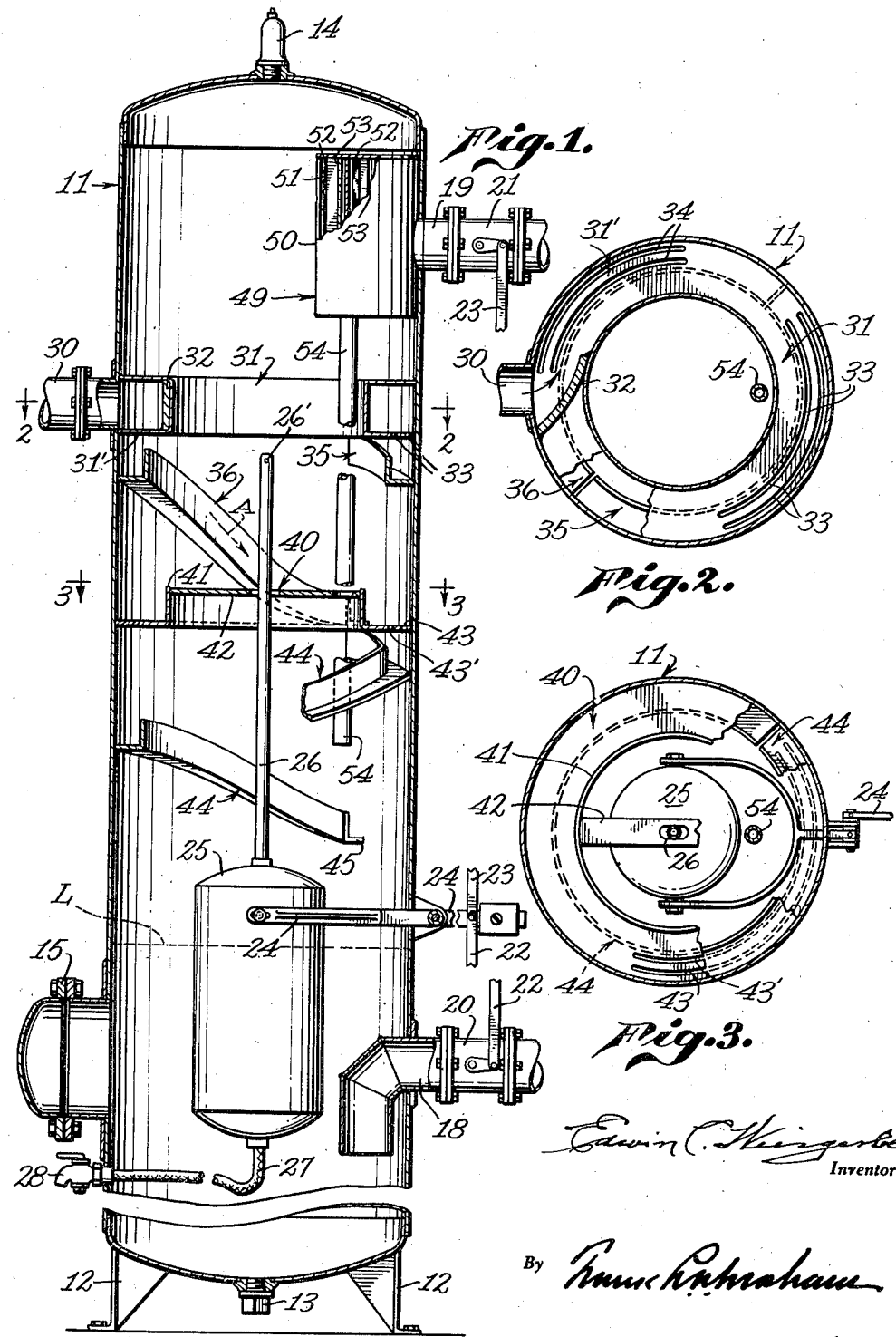

June 8, 1937. E. C. WEISGERBER 2,082,863
OIL AND GAS SEPARATOR
Filed Nov. 11, 1935

Edwin C. Weisgerber
Inventor

By
Attorney

Patented June 8, 1937

2,082,863

UNITED STATES PATENT OFFICE 2,082,863

OIL AND GAS SEPARATOR

Edwin C. Weisgerber, Los Angeles, Calif., assignor to Master Separator and Valve Company, a corporation of California Application November 11, 1935, Serial No. 49,229

4 Claims. (Cl. 183—2.7)

This invention has to do in a general way with the art of separating and recovering liquid and gas from a fluid mixture containing both liquid and gas and is more particularly related to improvements in oil and gas separators such as are used in conjunction with the production of petroleum.

Separators of the type above referred to such as are generally used in conjunction with oil wells usually consist of a shell or receptacle of vertical cylindrical form which has an oil and gas inlet near the top thereof and is provided with an oil outlet near its bottom and a gas outlet near its top. Within the shell various types of baffles etc. are provided to control the flow of the fluid therein so that the gas escapes from the oil as the latter gravitates toward the bottom of the shell. These separators are usually provided with float means associated with valves in the outlet connections so that a predetermined fluid level and gas pressure is maintained within the separator or trap.

It is a primary object of this invention to provide an oil and gas separator of the class described which will operate with a high degree of separating efficiency upon any oil or gas mixture. It is a further object of this invention to provide a separator of the class described which is especially adapted for use in conjunction with an oil and gas mixture having a tendency toward excessive foaming or frothing. With this latter object in mind I have discovered that if an oil and gas mixture which has a great tendency toward foaming or frothing is subjected to the action of centrifugal force in addition to the gravitation and spreading action usually employed, that the oil films which retain the bubbles of gas in the foam or froth are more readily broken making for a more thorough and efficient separation.

My invention therefore contemplates a separator construction in which the gas and oil mixture is given a whirling or swishing action as it enters the separator and in which such whirling motion is maintained in the fluid medium until it reaches a predetermined point near the lower portion of the tank. With this point in mind my invention contemplates the use of spiral troughs or channels mounted on the inner surface of the tank below the point of entry of the gas-oil mixture such channels receiving the mixture from slots in an annular chamber provided at the inlet, and being inclined and shaped so as to conduct the fluid mixture downwardly in the tank in a general direction corresponding to the direction of rotation which the mixture has received upon its entry to the shell.

As a means of further increasing the separating efficiency of my invention, I contemplate the employment of a substantially horizontal spreading surface upon which the rotating stream or streams of fluid mixture are delivered and over which such mixture travels in a relatively rapidly moving thin sheet. During its movement in such sheet the mixture is delivered on down through suitably provided slots in the spreading surface which is in the nature of an intermediate gallery and into another spiral trough which conducts it on down to the bottom of the tank or to further galleries as may be provided depending upon the operating conditions and circumstances.

It is a further object of this invention to provide an oil and gas separator of the class described with scrubbing means associated with the gas outlet opening which will separate entrained water and oil from the gaseous medium and insure the delivery of a completely dry gas and the efficient recovery of all of the liquid in the fluid mixture.

It is a still further object of this invention to provide an improved float construction which is especially adapted for use in combination with an oil and gas separator or gas trap of the type hereinabove referred to. The details in the construction of a preferred embodiment of my invention, together with other objects attending its production, will be best understood from the following description of the accompanying drawing which is chosen for illustrative purposes only and in which Fig. 1 is a sectional elevation showing a preferred form of my invention;

Fig. 2 is a plan section taken in a plane represented by the line 2—2 of Fig. 1; and Fig. 3 is a plan section with parts broken away taken in a plane represented by the line 3—3 of Fig. 1.

More particularly describing the invention as herein illustrated, reference numeral 11 indicates a vertical cylindrical shell or receptacle which is shown as being supported upon legs 12 and is provided with a bottom drain plug 13, a blow-off valve 14 and a manhole 15 of any conventional construction.

The shell is provided with an oil outlet connection 18 near its bottom and with a gas outlet connection 19 near its top, such connections being provided with valves diagrammatically indicated at 20 and 21 respectively, such valves being controlled in the conventional manner by means of control arms 22 and 23 respectively, which are, in turn, connected to a float lever 24. The inner end of the lever 24 supports a float 25. This float and valve assembly which may be of any conventional type is provided for the purpose of maintaining a predetermined oil level (L) and a predetermined gas pressure within the shell.

Since the pressures encountered in gas traps of this character are frequently very large, it is necessary to provide the float with a vent opening of some kind for the purpose of pressure equalization therein. In this form of my invention the vent opening is formed in the nature of a pipe 26 which extends upwardly a substantial distance above the liquid level where it is provided with an opening 26'. In the case of very frothy oil, or oil which has a tendency to fog, some liquid will be carried into the float with surges in pressure, and will be deposited therein, frequently accumulating to a point that the "float" action is destroyed. In order to avoid this accumulation within the float, I provide the same with a drain opening which is connected, by means of a flexible conduit 27 to a drain valve 28 situated on the outside of the shell. The flexible conduit does not interfere with the operation of the float in any way, and the exterior drain valve permits withdrawing the contents of the float from time to time so that its efficient action is not impaired.

Reference numeral 30 indicates a gas and oil inlet connection which receives the fluid mixture from the well. Such connection is shown as being mounted upon the shell wall and has an opening through the wall which communicates with an annular chamber or gallery generally indicated by reference numeral 31. The gallery 31 is shown as being closed on top so as to provide a closed chamber for receiving the fluid mixture and within this gallery or chamber immediately opposite the inlet opening 30 I provide a deflecting plate or partition 32. This deflecting plate or partition 32 is designed so as to give a flow line to the oil and being composed of wear resisting material it reduces the abrasive action to a minimum. The plate is further formed and arranged so as to impart a unidirectional rotation to the fluid mixture thereby setting up the centrifugal action which is retained in the liquid stream through the remainder of the travel toward the bottom portion of the shell.

In this form of my invention the bottom wall 31' of the gallery or chamber 31 is shown as being provided with two sets of arcuate slots generally indicated at 33 and 34. These sets of slots are arranged in angularly spaced relation with each other and it will be observed that the outermost slot is a slight distance away from the wall of the shell.

Immediately below the sets of slots 33 and 34 I provide spiral trough members indicated generally by reference numerals 35 and 36 respectively. These trough members are shown as being in the nature of angle pieces which are bent in a spiral and are welded or otherwise secured to the inner surface of the shell below the corresponding slots.

The troughs, as pointed out above, are of a spiral nature and are downwardly inclined, the direction of the spiral or the incline being the same general direction as the direction of rotation which is imparted to the fluid mixture as it enters the annular chamber 31. In other words, the fluid mixture will leave the slots in the annular chamber 31 in the general direction of the arrow A in Fig. 1 and the inclination of the trough is such that this fluid will continue this same general direction of travel as it moves downwardly through the troughs. The troughs are located with their upper edges slightly behind (relative to the direction of moving fluid) the rear edges of the slot as is clearly illustrated in the dotted line positions of the troughs with respect to the slots in Fig. 2.

The fluid mixture flows downwardly through these spiral troughs and around the wall of the shell to the lower ends of the troughs where the mixture is discharged with a whirling or swishing action into a substantially horizontal gallery indicated by numeral 40. The centrifugal force obtained by the initial rotation imparted to the fluid, which is maintained by the spiral troughs, is effective to break down the film holding the gas bubbles and insure an efficient separation.

The gallery 40 is shown as being in the nature of a flat annular plate which is welded at its periphery to the inner surface of the tank such plate being formed at its inner circumference with a vertical flange member indicated by numeral 41. A cover plate 42 is shown as being mounted upon the upper edge of the flange 41.

The bottom plate of the gallery 40 is provided with a pair of radially spaced slots indicated by reference numerals 43 and 43' which extend about one-third the circumference of the gallery on the horizontal bottom thereof. The fluid mixture swishes around this annular gallery, part of the same flowing downwardly in thin streams through arcuate slots 43 and 43' from which it falls down on to a second spiral trough generally indicated by reference numeral 44. This spiral trough 44, like the two spiral sections referred to above has the same direction of inclination as the direction of movement of the fluid so that the fluid mixture flows downwardly through a spiral path along the periphery of the tank without changing its direction as it enters this trough. Further separation is effected in this trough and since the pitch of the spiral in this trough is considerably decreased (the spiral running substantially one and one-half times around the shell) its velocity is somewhat retarded by the time it reaches the discharge end 45 of the bottom spiral 44. In order that the liquid from the discharge end 45 of the bottom spiral 44 may be received in the body of oil contained in the bottom of the shell with the minimum amount of disturbance in such body of oil, I propose to terminate the end of the bottom spiral 44 at a substantial distance above the oil level L.

The gas which is released from the oil as it travels downwardly through the various troughs and over the gallery as described above, moves upwardly through the mid-portion of the shell, entering the gas discharge connection 19 through a scrubbing unit generally indicated by reference numeral 49. This scrubbing unit may be of any conventional construction but it is preferably of the type shown and described in my co-pending application, Serial No. 49,462 entitled Scrubber which is being filed concurrently herewith. This scrubber unit 49 has an inlet front 50 and is provided with a series of slotted plates 51, screen members 52 and deflecting members 53, such as are fully described and illustrated in my co-pending application above referred to. The unit 49 is also provided with an outlet pipe 54 leading downwardly to the bottom portion of the shell, such pipe being effective to conduct the entrapped liquid separated from the gas in the scrubber back into the body of liquid in the shell, thereby reducing the possibility of loss of liquid to a minimum.

It is to be understood that while I have herein described and illustrated one preferred form of my invention, that the invention is not limited to the precise construction described above, but includes within its scope whatever changes fairly come within the spirit of the appended claims.

I claim as my invention:

1. In a gas and oil separator, the combination of: a vertical shell; an annular chamber mounted on the wall of said shell near its upper end, said chamber having bottom openings; a horizontal gallery mounted on said shell wall below said chamber; means for introducing a gas and oil fluid mixture into said annular chamber; means for imparting a unidirectional flow to said fluid mixture as it enters said chamber; spiral trough means mounted on said shell wall below said chamber and adapted to conduct fluid flowing through said chamber opening on to said gallery; and a second spiral trough mounted on said shell wall below said gallery and adapted to conduct fluid flowing through openings in the bottom of said gallery into the bottom portion of said shell.

2. In a gas and oil separator, the combination of: a vertical shell; an annular chamber mounted on the wall of said shell near its upper end, said chamber having bottom openings; a horizontal gallery mounted on said shell wall below said chamber; means for introducing a gas and oil fluid mixture into said annular chamber; means for imparting a unidirectional flow to said fluid mixture as it enters said chamber; spiral trough means mounted on said shell wall below said chamber and adapted to conduct fluid flowing through said chamber opening on to said gallery; and a second spiral trough mounted on said shell wall below said gallery and adapted to conduct fluid flowing through openings in the bottom of said gallery into the bottom portion of said shell, all of said spiral troughs being downwardly inclined in the general direction of the rotation which has been imparted to said fluid in said chamber.

3. In a gas and oil separator, the combination of: a vertical shell; an annular chamber mounted on the wall of said shell near its upper end, said chamber having an arcuate slot formed in its bottom wall in inwardly spaced relation with the inner surface of said shell; a substantially horizontal gallery mounted on said shell wall at a substantial distance below said chamber, said gallery having an arcuate slot formed in its bottom wall in inwardly spaced relation with the surface of said shell; an inlet pipe mounted in the wall of said shell and opening into said chamber; a deflecting partition mounted across said chamber opposite said inlet pipe for imparting a unidirectional rotative movement to fluid admitted through said inlet; spiral trough means mounted on the inner surface of said shell beneath the slot in said chamber for receiving fluid from said slot and conducting same around said shell into said gallery; and a second spiral trough on the wall of said shell beneath said gallery for receiving fluid from the slot in said gallery and conducting same downwardly around said shell into the bottom portion thereof.

4. In a gas and oil separator, the combination of: a vertical shell; an annular chamber mounted on the wall of said shell near its upper end, said chamber having an arcuate slot formed in its bottom wall in inwardly spaced relation with the inner surface of said shell; a substantially horizontal gallery mounted on said shell wall at a substantial distance below said chamber, said gallery having an arcuate slot formed in its bottom wall in inwardly spaced relation with the surface of said shell; an inlet pipe mounted in the wall of said shell and opening into said chamber; a deflecting partition mounted across said chamber opposite said inlet pipe for imparting a unidirectional rotative movement to fluid admitted through said inlet; spiral trough means mounted on the inner surface of said shell beneath the slot in said chamber for receiving fluid from said slot and conducting same around said shell into said gallery; and a second spiral trough on the wall of said shell beneath said gallery for receiving fluid from the slot in said gallery and conducting same downwardly around said shell into the bottom portion thereof, said troughs being inclined downwardly in the general direction of the rotation imparted to said fluid in said chamber.

EDWIN C. WEISGERBER.